(12) United States Patent  
Yang

(10) Patent No.: US 7,528,557 B2
(45) Date of Patent: May 5, 2009

(54) ELECTRONIC CONTROLLER FOR HIGH-POWER GAS DISCHARGING LAMP

(75) Inventor: Luoding Yang, Pan An County (CN)

(73) Assignee: Fanglu Lou, Zhejiang Province (CN)

( * ) Notice: Subject to any disclaimer, the term of this patent is extended or adjusted under 35 U.S.C. 154(b) by 252 days.

(21) Appl. No.: 11/506,182

(22) Filed: Aug. 17, 2006

(65) Prior Publication Data

US 2008/0061715 A1   Mar. 13, 2008

Related U.S. Application Data

(63) Continuation of application No. PCT/CN2004/000349, filed on Apr. 14, 2004.

(30) Foreign Application Priority Data

Feb. 17, 2004   (CN) .......................... 2004 1 0016366

(51) Int. Cl.
*H05B 37/02* (2006.01)
(52) U.S. Cl. .................... 315/307; 315/224; 315/247
(58) Field of Classification Search ............. 315/209 R, 315/224–226, 246–247, 276, 291, 307–308, 315/DIG. 7
See application file for complete search history.

(56) References Cited

U.S. PATENT DOCUMENTS

| | | | | |
|---|---|---|---|---|
| 5,642,019 A * | 6/1997 | Sun | ............................. | 315/244 |
| 5,834,906 A * | 11/1998 | Chou et al. | .................. | 315/307 |
| 5,900,701 A * | 5/1999 | Guhilot et al. | .............. | 315/307 |
| 6,072,282 A * | 6/2000 | Adamson | ..................... | 315/276 |
| 6,181,079 B1 * | 1/2001 | Chang et al. | ................. | 315/247 |
| 6,181,084 B1 * | 1/2001 | Lau | ............................. | 315/291 |
| 7,023,148 B2 * | 4/2006 | Chao et al. | ................... | 315/307 |
| 7,038,396 B2 * | 5/2006 | Hung | .......................... | 315/224 |
| 2004/0183463 A1 * | 9/2004 | Sun et al. | ..................... | 315/224 |

FOREIGN PATENT DOCUMENTS

CN        2168387 Y      6/1994
CN        1318968 A     10/2001

OTHER PUBLICATIONS

International Search Report, International Patent Application No. PCT/CN2004/000349, dated Dec. 9, 2004, 2 pages. Chinese language version of same also included.

* cited by examiner

*Primary Examiner*—David Hung Vu
*Assistant Examiner*—Tung X Le
(74) *Attorney, Agent, or Firm*—Stoel Rives LLP

(57) ABSTRACT

An electronic controller for a high-power gas discharging lamp bulb includes a filter circuit to reduce interference and control the electromagnetic characteristics of an input power signal. A rectifier circuit electrically communicates with the filter circuit to generate a DC power signal. A power factor switching circuit electrically communicates with the rectifier circuit to increase the power factor and to stabilize the voltage and current of the power signal. A driver inversion and power control circuit electrically communicates with the power factor switching circuit to adjust to loading of the controller. An initiation trigger protective circuit electrically communicates with the driver inversion and power control circuit to control the timing of passing a trigger voltage to the lamp. An output matching circuit electrically communicates with the initiation trigger protective circuit to match the impedance of the lamp bulb connected to the output matching circuit.

21 Claims, 3 Drawing Sheets

ELECTRONIC CONTROLLER FOR HIGH-POWER GAS DISCHARGING LAMP

RELATED APPLICATIONS

This application is a continuation of International Application No. PCT/CN 2004/000349, filed Apr. 14, 2004, which claims benefit of Chinese Patent Application No. CN 200410016366.4, filed Feb. 17, 2004.

COPYRIGHT NOTICE

© 2006 Fanglu Lou. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to a controller device for illuminating a high-power gas discharging lamp. More specifically, the controller controls high-power gas discharging tubes comprising dysprosium, indium selenide, natrium, metal halide bulb, and/or controls cold cathode luminous tubes.

BACKGROUND OF THE DISCLOSURE

The rating voltage of a gas discharging lamp is generally 80V-150V, but the current voltage supply is 220V. For proper use, one should decrease the current supply from 220V to about 80V-150V. Simultaneously, the bulb is provided with a step down, current limiting, and protective device of equivalent power. An inductive, low frequency choke is the most commonly adopted for these purposes. Such a low frequency choke occupies a large volume and is heavy. It also exhibits high loss, low power factor, high noise and strong interference, and low illumination quality; and its voltage, current, and power are difficult to control.

Chinese Patent No. 98218196.5 teaches an adaptive controller for a high intensity gas discharging lamp, which achieves light changes by adjusting inductance coil and inductive capacity. Like conventional inductance performance in regards to energy consumption, noise, power factor, voltage, current, and start-up, the adaptive controller consumes large amounts of energy and exhibits strong interference, and its power, voltage, and current are likely to be affected by circuitry voltage fluctuation. Therefore, the adaptive controller is not generally well-suited for application in a high-power gas discharging lamp.

Chinese Patent No. 01264335.1 teaches, however, a high power-factor electronic ballast for controlling a high-power gas discharging lamp, which provides an electronic ballast that can increase the power factor of the discharging lamp and is, therefore, energy saving and low-cost. Such an electronic ballast provides high quality lighting, and has a long service life, but does not work effectively if the power of the lamp is high. Because of the insufficiency of the pulse time and pulse amplitude, if there is exterior voltage fluctuation, the lamp is difficult to start up, or even be lighted. In the absence of a high-power, start-up trigger lighting circuit, the electronic ballast is not suitable for use in a high-power gas discharging lamp because of its poor stability and low reliability.

SUMMARY OF THE DISCLOSURE

Various embodiments described herein are directed to systems and methods for control of a high-power gas discharging lamp. According to one embodiment, an electronic controller for a high-power gas discharging lamp bulb includes a filter circuit to reduce interference and control the electromagnetic characteristics of an input power signal. A rectifier circuit electrically communicates with the filter circuit to generate a DC power signal. A power factor switching circuit electrically communicates with the rectifier circuit to increase the power factor and to stabilize the voltage and current of the power signal. A driver inversion and power control circuit electrically communicates with the power factor switching circuit to adjust to loading of the controller. An initiation trigger protective circuit electrically communicates with the driver inversion and power control circuit to control the timing of passing a trigger voltage to the lamp. An output matching circuit electrically communicates with the initiation trigger protective circuit to impedance match the lamp bulb connected to the output matching circuit.

According to another embodiment, an electronic controller for a high-power gas discharging lamp bulb includes a FU surge protector that is connected in series to a power input. A piezoelectric resistor connects to the FU surge protector. A plurality of transformers are in parallel with a plurality of capacitors, which electrically communicate with the piezoelectric resistor and the power input. A bridge rectifier in electrical parallel communication with the plurality of inductors and capacitors generates a DC power signal. The controller includes a power factor switching transformer, a first transistor, and a first integrated circuit receiving as an input an output of the power factor switching transformer. The first integrated circuit has an output control signal that is sent to the first transistor to control the voltage and current driving the first transistor. A power factor resistor and a power factor capacitor are electrically connected in parallel, with an input supplied by the first transistor. The power factor capacitor decreases the current ripple of the power signal, and the power factor resistor absorbs the discharging of the capacitor to balance the ripple tolerance of the capacitor, thereby creating a stabilized power signal having a corrected power factor value.

The embodiment may further include a potentiometer in series with a first power control resistor. A second power control resistor connects to the output of the power factor resistor and to the first power control resistor. A first power control capacitor connects between the potentiometer and the first power control resistor, and the second power control resistor. A second integrated circuit has as inputs a power signal from the potentiometer and a power signal from the second power control resistor, so that the second integrated circuit compares the two power signals. A second power control capacitor is at a first output of the second integrated circuit. A power control transformer electrically communicates with the second power control capacitor. A second transistor electrically communicates with the power control transformer. A third transistor electrically communicates with a second output of the second integrated circuit.

The embodiment may further include a blocking capacitor connecting outputs of the first and second transistors, carrying high frequency AC power to the lamp bulb. A third integrated circuit has an input that electrically communicates with the second and third transistors. An initiation trigger resistor electrically communicates with an output of the second transistor. A relay has a switch controlled by an output of the third integrated circuit and includes a first contact connectable to the initiation trigger resistor. An initiation trigger capacitor is connectable to a second contact of the relay switch, such that when the switch is closed, the initiation trigger capacitor is charged by the power passed through the initiation trigger resistor. An initiation trigger transformer connected between the initiation trigger capacitor and the lamp bulb is to discharge the initiation trigger capacitor, and thus produce a higher trigger voltage to the lamp bulb.

The embodiment may further include a SCR (silicon controlled rectifier) whose gate and T electrodes are connected to different input pins of the third integrated circuit to produce a pulse train in the output of the third integrated circuit, thus triggering the lamp bulb in succession. An accessory power supply circuit has as an input the DC power signal output of the bridge rectifier, wherein an output of the power supply circuit delivers a required voltage to the first, second, and third integrated circuits.

DETAILED DESCRIPTION OF PREFERRED EMBODIMENTS

The various embodiments of the present disclosure will be best understood by reference to the drawings, wherein like parts are designated by like numerals throughout. It will be readily understood that the components of the present disclosure, as generally described and illustrated in the figures herein, could be arranged and designed in a wide variety of different configurations. Thus, the following more detailed description of the embodiments of the apparatus, system, and method of the present disclosure is not intended to limit the scope of the disclosure, but is merely representative of its various embodiments.

The disclosed controller functions to control a high-power gas discharging lamp. The controller not only is light in weight and compact in volume, but also has simple circuitry, is low cost, has fewer components, and is easy to install. Furthermore, its drive waveform has low distortion and can work steadily and reliably with constant current, voltage, and power. It is particularly well-suited to be applied to a high-power gas discharging lamp.

Figure 1:
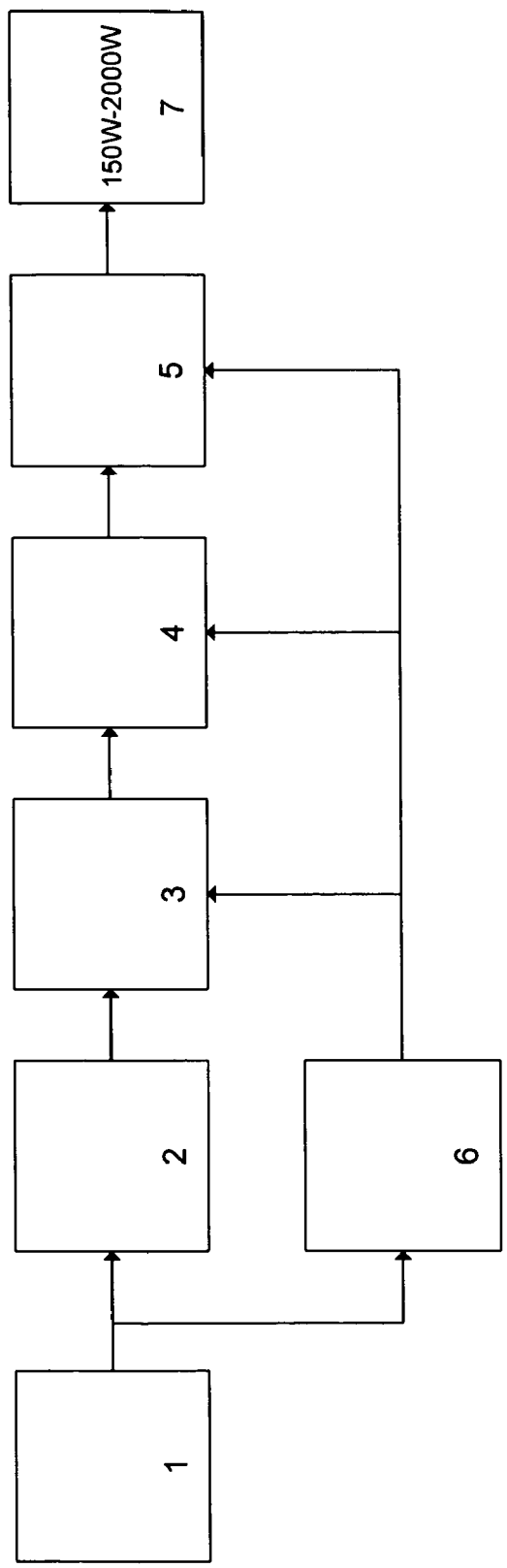
FIG. 1 is a block diagram of the controller disclosed herein.

Referring to FIG. 1, an electronic controller 100 for a high-power gas discharging lamp comprises, inter alia, a filter circuit 1, a rectifying circuit 2, a power factor switching circuit 3, a driver inversion and power control circuit 4, an initiation trigger protective circuit 5, an output matching circuit 7, and an accessory power supply circuit 6, which may be sequentially connected, except for circuit 6, which supplies power to circuitry of the controller 100.

Figure 2A:
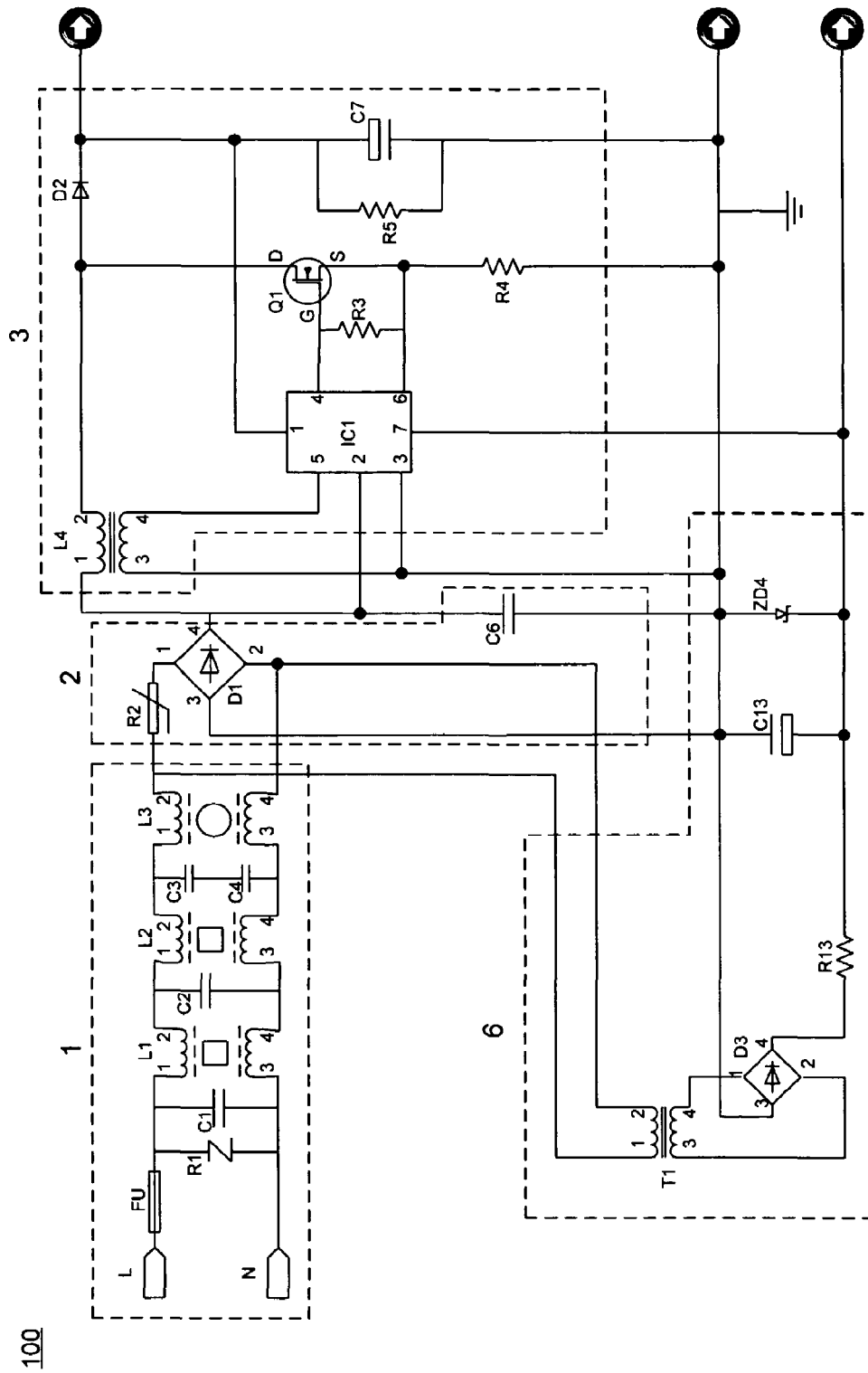
FIGS. 2A and 2B together are one electrical circuit diagram of the controller of FIG. 1, showing the circuitry details of each block displayed in FIG. 1.
Figure 2B:
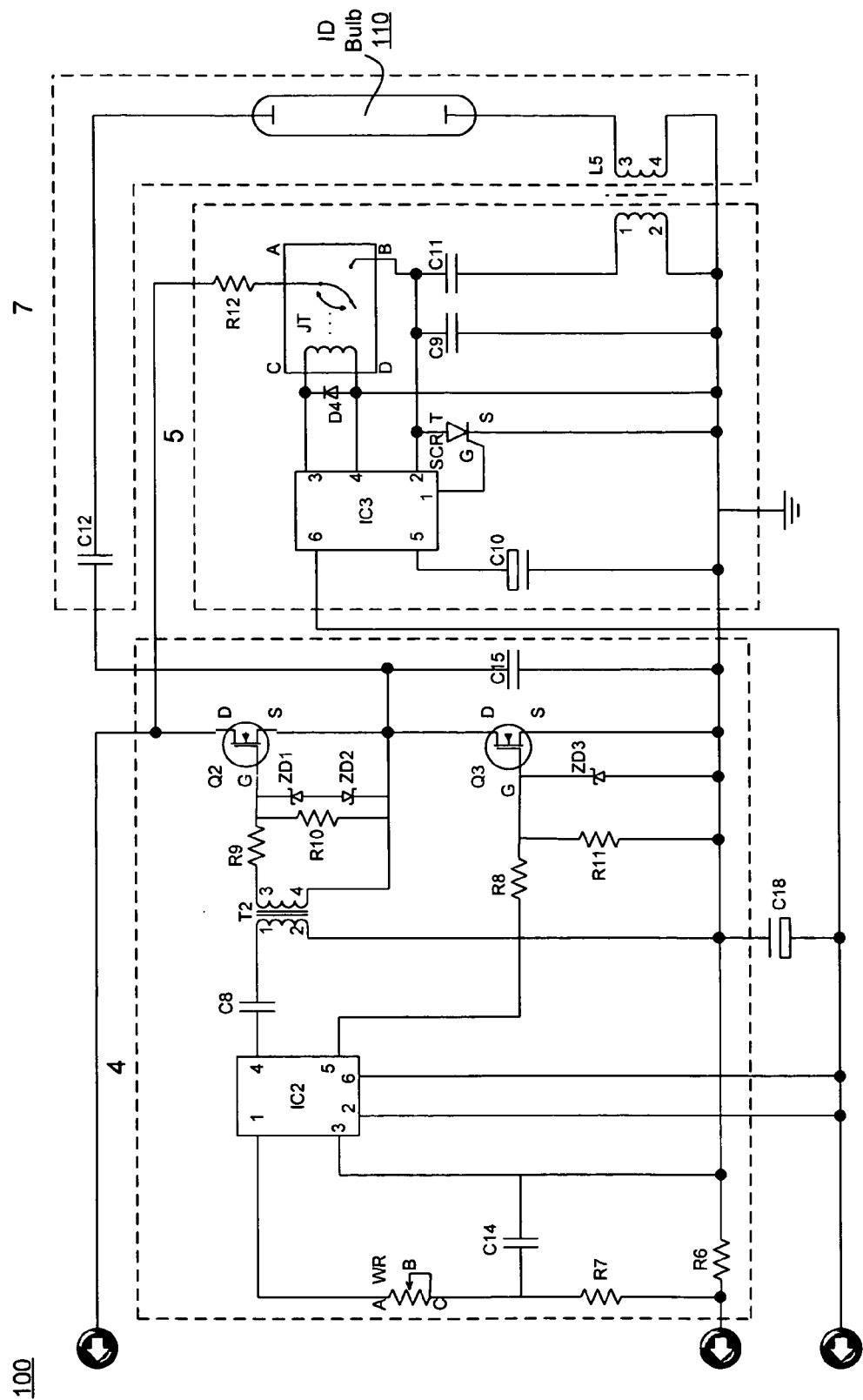

Referring to FIGS. 2A and 2B, the power factor switching circuit 3 is formed by a thick film integration circuit IC1, which connects to a transistor switch Q1 and transformer L4, respectively, such that the switch Q1 is connected to a diode D2 and to resistors R4, R3. The driver circuit of the power inversion control is formed by a thick film integration circuit IC2, which connects to a transistor switch Q3. The Q3 switch connects to resistors R8, R11, and to a voltage regulator diode ZD3. A transistor switch Q2 is connected to voltage regulator diodes ZD1, ZD2, resistors R9, R10, transformer T2, and capacitor C8. The initiation trigger protective circuit is formed by a thick film integration circuit IC3, which connects to capacitor C10, to a silicon controlled rectifier (SCR), to a diode D4, to capacitors C9, C11, to transformer L5, and to relay JT.

The disclosed controller transforms 50 Hz AC (alternating current) power supply into a 30 KHz higher frequency AC power supply so as to power up all electronic structures of the lamp and controller. The controller is compact, its weight is only about one-fourth that of conventional controllers, and has a high power factor, e.g., approximately 1. Adopting a multilevel common mode (differential mode filter), the filter circuit of the controller can lessen the electromagnetic, radiated, and conducted interference produced during activation of an on-off switch. Filtering circuitry also rejects interference to the controller, which is caused by input power supply noise. The controller meets the standard of EIECEE (Euro IEC Conformity for Testing and Certification of Electric Equipment).

The present disclosure is implemented with three integrated circuits (ICs), which result in high-integration, fewer required parts, simple circuitry, and low-cost design. The accessory power supply circuit, which supplies power for the ICs, works after electric power passes through the transformer and the voltage regulator tube, thereby making the controller highly stable and reliable. By having integrated circuit IC2 drive transistor switch Q3, the driving circuit is simplified, has lower distortion, is able to work with constant current, constant voltage, and constant power. The driving circuit is thus capable of working steadily under short circuit, open circuit, and abnormal conditions. The controller also has a special start-up trigger circuit. Therefore, the controller is particularly well-suited to application with high-power gas discharging lamps in having a high power factor, long service life, high quality of lighting, and in meeting electromagnetic compatibility standards and environmental protection demands.

Referring again to FIGS. 1 and 2A, block 1 is a filter circuit 1. As soon as a lamp switch (not shown) is turned on, there will be a voltage surge delivered to the controller 100. R1, a piezoresistor, absorbs the transient voltage surge and protects the controller 100 from a high transient voltage impulse. R2, an NTC (negative temperature coefficient) thermistor, is used to suppress the transient current surge of the power supply and achieves a soft startup. The input power supply causes noise and/or interference. A multilevel common mode, implemented through a differential mode filter, comprises capacitors C1, C2, C3, and C4 and transformers L1, L2, and L3 and works bilaterally, thereby lessening the electromagnetic, radiated, and conducted interference produced when turning the lamp switch on and off and rejecting the interference to the controller.

The filter circuit 1 is connected to the FU protector tube from the L side by phase conductors. The other side of the FU protector is connected to resistor R1, C1, and port 1 of L1. The ground reference conductor, N, is connected to R1, C1 and to port 3 of L1. Port 2 of L1 is connected to C2 and to port 1 of L2. The other end of C2 is connected to port 4 of L1. Port 2 of L2 is connected to C3 and to port 1 of L3. Port 4 of L2 is connected to C4 and to port 3 of L3. The other end of C3 is connected to the other end of C4.

Block 2 is a rectifying circuit. D1, a bridge rectifier, is used to transform AC (alternating current) into DC (direct current), which supplies the controller after being filtered by capacitor C6. Rectifying circuit 2 connects to port 2 of L3, which is connected to one end of R2 and to port 1 of transformer T1. The other end of R2 is connected to port 1 of D1. Port 3 of D1 is connected to the cathode of capacitor C13. Port 4 of D1 is connected to pin 2 of IC1 (discussed below). Port 4 of L3 is connected port 2 of D1, and to port 2 of transformer T2.

Block 3 is a power factor switching circuit. IC1 is a thick film integration circuit, such as an MC33262 power factor controller chip. The main function of IC1 is to increase the power-factor and control the voltage and current of switch Q1. Q1 (and other Q transistor switches discussed herein) are either a metal oxide-semiconductor field-effect transistor (MOSFET), or another transistor capable of operating in high voltage ranges, as herein discussed.

Sampled from the auxiliary winding of transformer L4, the current signal is sent to pin 5 of IC1. Sampled from the junction of D2 and C7, the voltage signal is sent to pin 1 of IC1, and the feedback signal, sampled from resistor R4, is sent to pin 6 of IC1. The parallel connection switching power supply, made up of voltage boosting transformer L4, and field effect transistors (FETs) Q1, Q2, boosts the rectified 200V DC up to about 395V DC. After performing a smoothing filtration, capacitor C7 further decreases the ripple current. The discharging resistor R5 absorbs the charging and discharging peak current, balancing the tolerance of the electrolytic capacitor C7.

As displayed, the power factor switching circuit 3 comprises pin 1 of IC1, which is connected to the anode of diode D2, to R5, and to the anode of C7, and is also connected to the D electrode of Q2. Pin 2 of IC1 is connected to C6, to port 4 of D1, and to port 1 of L4. Pin 4 of IC1 is connected to the other end of R3. The S electrode of Q1 is connected to one end of R4, and the other end of R4 is connected to one end of R5. The cathode of C7 is connected to one end of R6. Pin 7 of IC1 is connected to resistor R13. Port 2 of L4 is connected to the cathode of D2 and to the D electrode of Q1.

Referring again to FIGS. 1 and 2B, block 4 is a driver inversion and power control circuit. IC2 is a thick film integration circuit, such as an LM358 chip containing low power dual operational amplifiers, for driver and power control. The signal obtained by potentiometer WR, resistor R7, and capacitor C14 from the current sampling resistor R6, is sent to pins 1 and 3 of IC2 for comparison within IC2. The comparison signal is sent into IC2, which controls the output signals at pins 4 and 5. C8 provides coupling capacity, and T2 is a driving transformer. R8 and R9 are current limiting resistors. R10 and R11 are clamp resistors. Voltage regulation diodes ZD1, ZD2, and ZD3 protect the gate electrode G of field effect transistors Q2, Q3 when operating in both the forward and the reverse directions. Q2 and Q3 each comprise a half bridge switching circuit, which change the operational DC voltage to an AC voltage of about 30 Hz for supplying power to an intense discharge (ID) bulb 110 (in block 7). The "BC" port of potentiometer WR is connected to C14 and R7, and by adjusting the WR potentiometer, the power may be adjusted from a few watts up to one thousand watts.

The driver inversion and power control circuit 4 comprises one end of R7, which is connected to the other ends of R6, R4, R5, to the cathode of capacitor C7, to pin 3 of IC1, to port 3 of L4, to the other end of C6, to the cathode of voltage regulator tube ZD4, to the cathodes of capacitors C13 and C18, and to port 3 of bridge rectifier D1. Pin 3 of IC2 is connected to the other end of C14, to the other end of R6, port 2 of T2, to the cathode of C18, to R11, to the cathode of ZD3, to the S electrode of Q3, and to one end of C15, which are all connected together. Pins 2 and 6 of IC2 are connected to the anode of C18. Pin 4 of IC2 is connected to C8. The other end of C8 is connected to port 1 of T2. Pin 5 of IC2 is connected to R8. The other end of R8 is connected to R11, to the anode of ZD3, and to the gate G electrode of Q3. Port 3 of T2 is connected to R9. The other end of R9 is connected to one end of R10, to the anode of ZD1, and to the gate G electrode of Q2. Port 4 of T2 is connected to the other end of R10, to the anode of ZD2, to the S electrode of Q2, to the D electrode of Q3, to C15 and to C12. The cathode of ZD1 is connected to the cathode of ZD2. The D electrode of Q2 is connected to R12 and to the anode of D2.

Block 5 is an initiation trigger protective circuit 5. IC3 is a start-up trigger thick film integrated circuit, such as SG3525 chip containing regulating pulse-width modulators. High frequency AC charges capacitor C11 through resistor R12 and then C11 discharges. The discharge voltage from C11 is coupled from the auxiliary winding to the main winding of transformer L5, which supplies start-up voltage for the bulb 110. When the bulb is lighted, relay JT will cut off the working voltage automatically, at which time C9, C11, and a SCR (silicon controlled rectifier) will lose power, and the circuit steps into voltage stabilization. C15 absorbs the voltage pulse spike, and the capacitance of C10 is used to determine the RC time constant of the initiation trigger protective circuit 5.

The initiation trigger protective circuit 5 comprises pin 1 of IC3, which is connected to the gate G electrode of the SCR. Pin 2 of IC3 is connected to the T electrode of the SCR, to C9, to C11, and to the B electrode of relay JT. Pin 3 of IC3 is connected to the gate G electrode of relay JT and to the anode of D4. Pin 4 of IC3 is connected to the D electrode of relay JT and to the cathode of D4. Pin 4 is also connected to the S electrode of the SCR, to the cathode of C10, to the other end of R6, and to ports 2 and 4 of L5. Port 1 of L5 is connected to the other end of C11. Pin 5 of IC3 is connected to the anode of C10. Pin 6 of IC3 is connected to the anode of C18. The A electrode of relay JT is connected to R12. The other end of R12 is connected to the D electrode of Q2 and to the anode of D2.

Referring again to FIG. 2A, block 6 is an accessory power supply circuit 6. Switching in from blocks 1 and 2, transformed by T1, and rectified by D3, circuit 6 outputs an approximate 15V voltage from the filter circuit 1. After the output is filtered by the RC circuit comprising R13 and C13, and is stabilized by a voltage regulator diode ZD4, the output is then sent to each integrated circuit, thereby supplying current to integrated circuits IC1, IC2, and IC3. Transformer T1 and rectifier D3 may, of course, be adjusted to provide a different voltage (other than 15V), as required by IC1, IC2, and IC3.

The accessory power supply circuit 6 comprises port 1 of transformer T1, which is connected to port 2 of L3, and to R2. Port 2 of T1 is connected to port 2 of D1 and to port 4 of L3. Port 3 of T1 is connected to port 2 of bridge rectifier D3. Port 4 of T1 is connected to port 1 of D3. A common ground is formed by the common connections of: port 3 of D3, port 3 of D1, the cathodes of C13 and C18, the cathode of voltage regulator diode ZD4, pin 3 of IC1, port 3 of L4, one end of R4, C7, R6, and R7. Port 4 of D3 is connected to R13. The other end of R13 is connected to the anode of C13, to the anode of ZD4, to pin 7 of IC1, to pins 2 and 6 of IC2, to pin 6 of IC3, which are connected together to form a low voltage operational power supply channel.

Block 7 is an output matching circuit 7, to match the impedance of the lamp bulb, thus to maximize output power to the bulb. Block 7 comprises capacitor C12, the intense discharge (ID) lamp bulb 110, and the auxiliary winding of transformer L15. The ID bulb 110 can be a cold cathode luminous tube in addition to many types of dysprosium, indium selenide, natrium, or metal halide bulbs, to name a few.

The output matching circuit 7 comprises C12, which is connected to C15, to the S electrode of Q2, and to the D electrode of Q3. The other output end of C12 is connected to the ID bulb 110. Port 4 of L5 is connected to port 2 of L5, to C9, and to the S electrode of the SCR. Port 3, or the output port, of L5 is connected to the other end of the ID bulb 110.

Referring again to FIG. 2A, after the lamp is switched on, block 1 provides 50 Hz AC to the filter circuitry of block 1, and R1 absorbs the transient surge voltage from the power supply. To discern amongst the three levels of common mode, the differential mode combination filter comprises transformers L1-L3 and capacitors C1-C4, which reject (or filter) the interference from the input power supply and from the controller 100 bilaterally so as to make the controller 100 electromagnetically compatible with international standards of the USA, Europe, and other countries.

After being filtered, the power signal is divided into two signals: one accesses block 6, and the other accesses block 2, and then is rectified into about 200V DC. Block 3 functions to realize voltage stabilization, current stabilization, and power factor correction by controlling the Q1 switch.

The input DC voltage signal of the controller 100 from block 6 is sent to pin 2 of IC2 and the output DC signal is sent to pin 1 of IC1. When the voltage of the input power supply is changed, the input and the output voltage signals will be compared in IC1. The benchmark in IC1 will react, and pin 4 of IC1 will output the resultant voltage signal, which in turn controls the Q1 switch so as to achieve voltage stabilization. The DC inputs from port 1 of L4 and outputs from port 2 of L4. Transformed to ports 3 and 4 of L4, the current signal is processed and analyzed in IC1. Then, pin 4 of IC1 outputs a control signal so as to achieve current stabilization.

Through L4, Q1, and D2, the operating voltage is increased, the phase of the voltage is increased, the voltage phase is in the wake of the current phase, and the power factor is increased to nearly 1. The stable output of power supply is sent to block 4.

Again referring to FIG. 2B, block 4 functions to realize voltage driver inversion and power control. IC2 outputs the high frequency oscillation signal from pin 4. Coupled by C8, isolated and matched by T2, the output signal drives Q2. Pin 5 directly couples to Q3 with current limiting through R8, which drives Q3. Working, in turn, in the upper half period and in the lower half period, Q3 transforms the stable DC voltage into high frequency AC voltage, and the inversion frequency is set in IC2.

When power loading or the power of the bulb is changed, the current of the controller 100 is changed accordingly. R6 is the current sampling resistor of the controller 100. The sampling signal is sent through R7 from one end of R6. The signal on the other end of R6 is sent to pin 3 of IC3. A part of the signal, passing through the connection point of R7 and C14, is sent to potentiometer WR. Adjusted by WR, the signal is sent to pin 1 of IC3. After processed in IC3, the signal is delivered from pin 4 of IC2 to control the output value of Q2 and Q3. Thusly, the loading ability of the controller 100 is changed according to the change of the loading, e.g., the impedance of the ID lamp bulb 110.

Block 5 is the initiation trigger protective circuit. The high frequency AC power supply is sent to the ID bulb 110 by Q2 and Q3 through block 7 and blocking capacitor C12. The high DC voltage, controlled by R12, charges C11 through relay JT, which is normally closed. After C11 is charged, C11 discharges through L5. At this time, the winding between pins 1 and 2 of L5 produces induced electromotive force, which induces the winding between pins 3 and 4 of L5 to produce higher trigger voltage, thus lighting the ID bulb 110 of the tube. When the tube is lighted, the C and D ports of relay JT receives the electricity, wherein JT is attracted and the initiation trigger protective circuit is closed.

If the ID bulb 110 is changed or the load fails, relay JT is still closed and C11 does not get the trigger voltage, so there is no discharging process and L5 has no induced voltage. In the case of the latter, the lamp cannot be lighted, and the controller 100 is protected. Because of the variance of power and varying features present in different kinds of tubes, there is a set of oscillation switching signals in IC3. The SCR produces a pulse train of these signals through pins 1 and 2 of IC3, and the pulse train triggers the ID bulb 110 in succession. If there exists lamp holder creepage, cap corruption, glass shell cracking, or other failure, C9 will feedback the signal to IC3, which will stop outputting pulse train, thereby protecting the controller 100. After the failure is removed, IC3 will start up again.

The input operating voltage ranges from 150V to 250V; the operating frequency ranges from 50 Hz to 60 Hz; and the operating power ranges from 150 W to 2000 W.

It will be obvious to those having skill in the art that many changes may be made to the details of the above-described embodiments without departing from the underlying principles of the invention. The scope of the present invention should, therefore, be determined only by the following claims.

The invention claimed is:

1. An electronic controller for a high-power gas discharging lamp having a bulb, the controller comprising:
   a filter circuit to reduce interference and control the electromagnetic characteristics of an input power signal;
   a rectifier circuit in electrical communication with the filter circuit, to generate a DC power signal to the controller;
   a power factor switching circuit in electrical communication with the rectifier circuit, to increase the power factor and to stabilize the voltage and current of the power signal;
   a driver inversion and power control circuit in electrical communication with the power factor switching circuit, to adjust to loading of the controller and including an integrated circuit, to drive and control the power signal;
   first and second current sampling resistors, a potentiometer, and a capacitor, the first current sampling resistor passing a first current signal to the integrated circuit for comparison with a second current signal passed by the potentiometer and the second current sampling resistor, the capacitor being connected between the integrated circuit side of the first and second resistors;
   an initiation trigger protective circuit in electrical communication with the driver inversion and power control circuit, to control the timing of passing a trigger voltage to the lamp; and
   an output matching circuit in electrical communication with the initiation trigger protective circuit, to match the impedance of the lamp bulb connected to the output matching circuit.

2. The electronic controller of claim 1, further comprising:
   an accessory power supply circuit in electrical communication with the filter circuit and the rectifier circuit, the accessory power supply circuit to generate a voltage required to power at least one integrated circuit located within the controller.

3. The electronic controller of claim 1, wherein the filter circuit comprises a surge protector and a piezoresistor to protect against transient surges in voltage and current of the input power signal.

4. The electronic controller of claim 1, wherein the filter circuit comprises a plurality of transformers in parallel, including a plurality of intervening capacitors, also in parallel.

5. The electronic controller of claim 1, wherein the rectifier circuit comprises a bridge rectifier that rectifies an input AC power signal into a DC power signal.

6. The electronic controller of claim 1, wherein the integrated circuit constitutes a first integrated circuit and wherein the power factor switching circuit comprises a second integrated circuit that controls the voltage and current driving a MOSFET.

7. The electronic controller of claim 6, wherein the power factor switching circuit further comprises:
   a resistor and a capacitor in parallel, electrically connecting the MOSFET and the power inversion and control circuit, the capacitor to decrease the current ripple of the power signal, and the resistor to absorb the discharging of the capacitor to balance the ripple tolerance of the capacitor.

8. The electronic controller of claim 1, wherein the initiation trigger protective circuit comprises a second integrated circuit to regulate pulse width of the power signal sent to the lamp bulb.

9. The electronic controller of claim 8, wherein the output matching circuit comprises a capacitor in electrical communication with an output of a MOSFET of the driver inversion and power control circuit, and the capacitor in electrical communication with the lamp bulb, to provide high frequency AC voltage thereto.

10. An electronic controller for a high-power gas discharging lamp having a bulb, the controller comprising:
   a filter circuit to reduce interference and control the electromagnetic characteristics of an input power signal;
   a rectifier circuit in electrical communication with the filter circuit, to generate a DC power signal to the controller;
   a power factor switching circuit in electrical communication with the rectifier circuit, to increase the power factor and to stabilize the voltage and current of the power signal;
   a driver inversion and power control circuit in electrical communication with the power factor switching circuit, to adjust to loading of the controller and including an integrated circuit, to drive and control the power signal, the integrated circuit comprising a first output in electrical communication with, in series, a capacitor, a transformer, a first current limit resistor, and a first MOSFET;
   an initiation trigger protective circuit in electrical communication with the driver inversion and power control circuit, to control the timing of passing a trigger voltage to the lamp; and
   an output matching circuit in electrical communication with the initiation trigger protective circuit, to match the impedance of the lamp bulb connected to the output matching circuit.

11. The electronic controller of claim 10, wherein the integrated circuit comprises a second output in electrical communication with, in series, a second current limit resistor and a second MOSFET.

12. An electronic controller for a high-power gas discharging lamp having a bulb, the controller comprising:
   a filter circuit to reduce interference and control the electromagnetic characteristics of an input power signal;
   a rectifier circuit in electrical communication with the filter circuit, to generate a DC power signal to the controller;
   a power factor switching circuit in electrical communication with the rectifier circuit, to increase the power factor and to stabilize the voltage and current of the power signal;
   a driver inversion and power control circuit in electrical communication with the power factor switching circuit, to adjust to loading of the controller:
   an initiation trigger protective circuit in electrical communication with the driver inversion and power control circuit, to control the timing of passing a trigger voltage to the lamp, wherein the initiation trigger protective circuit comprises:
   an integrated circuit to regulate pulse width of the power signal sent to the lamp bulb,
   a resistor in electrical communication with an output of a MOSFET of the power inversion and control circuit,
   a relay having a switch, in which a control of the switch is in magnetic communication with an output of the integrated circuit, and a first contact of the switch is connected to the resistor, and
   a capacitor in electrical communication with a second contact of the relay switch, through which the capacitor is charged when the relay switch is closed; and
   an output matching circuit in electrical communication with the initiation trigger protective circuit, to match the impedance of the lamp bulb connected to the output matching circuit.

13. The electronic controller of claim 12, further comprising:
   a transformer having primary and secondary windings, the primary windings in electrical communication with the capacitor, and the secondary windings connectable to the lamp bulb, to produce a high trigger voltage to light the lamp bulb.

14. The electronic controller of claim 13, wherein upon lighting the lamp bulb, the relay switch is shut off, discontinuing voltage to the capacitor.

15. The electronic controller of claim 12, further comprising:
   a SCR (silicon controlled rectifier) whose gate and T electrodes are connected, respectively, to two input pins of the integrated circuit, to produce a pulse train in the output of the integrated circuit, thereby triggering the lamp bulb in succession.

16. An electronic controller for a high-power gas discharging lamp having a bulb, the controller comprising:
   a surge protector connected, in series, to a power input;
   a piezoelectric resistor connected to the surge protector;
   a plurality of transformers in parallel with a plurality of capacitors in electrical communication with the piezoelectric resistor and the power input;
   a bridge rectifier in electrical parallel communication with the plurality of inductors and capacitors, to generate a DC power signal;
   a power factor switching transformer;
   a first transistor;
   a first integrated circuit receiving as an input an output of the power factor switching transformer, and having as an output a control signal, which is sent to the first transistor to control the voltage and current driving the first transistor;
   a power factor resistor and a power factor capacitor in parallel, with an input supplied by the first transistor, the power factor capacitor to decrease the current ripple of the power signal, and the power factor resistor to absorb the discharging of the capacitor to balance the ripple tolerance of the capacitor, thereby creating a stabilized power signal having a corrected power factor value;

a potentiometer in series with a first power control resistor;

a second power control resistor connected to the output of the power factor resistor and to the first power control resistor;

a first power control capacitor connected between the potentiometer and the first power control resistor, and the second power control resistor;

a second integrated circuit having as inputs a power signal from the potentiometer and a power signal from the second power control resistor, wherein the second integrated circuit compares the two power signals;

a second power control capacitor at a first output of the second integrated circuit;

a power control transformer in electrical communication with the second power control capacitor;

a second transistor in electrical communication with the power control transformer; and a third transistor in electrical communication with a second output of the second integrated circuit.

17. The electronic controller of claim 16, further comprising:

first and second current limiting resistors connected, respectively, between the power control transformer and the second transistor, and between the second output of the second integrated circuit and the third transistor.

18. The electronic controller of claim 16, further comprising:

first and second clamp resistors connected to, respectively, gates of the second and third transistors; and first and second at least one voltage regulation diode connected in parallel with respective first and second clamp resistors.

19. The electronic controller of claim 16, further comprising:

a blocking capacitor connecting outputs of the first and second transistors, carrying high frequency AC power, to the lamp bulb;

a third integrated circuit having an input in electrical communication with the second and third transistors;

an initiation trigger resistor in electrical communication with an output of the second transistor;

a relay having a switch controlled by an output of the third integrated circuit, and comprising a first contact connectable to the initiation trigger resistor;

an initiation trigger capacitor connectable to a second contact of the relay switch, wherein when the switch is closed, the initiation trigger capacitor is charged by the power passed through the initiation trigger resistor; and an initiation trigger transformer connected between the initiation trigger capacitor and the lamp bulb, to discharge the initiation trigger capacitor, and thereby produce a higher trigger voltage to the lamp bulb.

20. The electronic controller of claim 19, further comprising:

a SCR (silicon controlled rectifier) whose gate and T electrodes are connected, respectively, to two input pins of the third integrated circuit, to produce a pulse train in the output of the third integrated circuit, thereby triggering the lamp bulb in succession.

21. The electronic controller of claim 19, further comprising an accessory power supply circuit having as an input the DC power signal output of the bridge rectifier, wherein an output of the power supply circuit delivers a required voltage to power the first, second, and third integrated circuits.

* * * * *